United States Patent [19]
Tsuda et al.

[11] Patent Number: 6,056,348
[45] Date of Patent: May 2, 2000

[54] DRIVE APPARATUS FOR PIVOTABLE WINDOW PANE

[75] Inventors: Hirokazu Tsuda; Masaaki Shimizu, both of Toyohashi; Yasushi Aizawa, Hamana-gun; Toshiyasu Ishizuka, Hamamatsu, all of Japan

[73] Assignee: Asmo Co., Ltd., Kosai, Japan

[21] Appl. No.: 08/988,667

[22] Filed: Dec. 11, 1997

[30]     Foreign Application Priority Data

Dec. 24, 1996 [JP] Japan .................................... 8-343407

[51] Int. Cl.⁷ ....................................................... B60J 1/12
[52] U.S. Cl. .......................... 296/146.16; 49/324; 49/340
[58] Field of Search .......................... 296/146.16; 49/324, 49/340, 345; 74/89; 292/263

[56]              References Cited

U.S. PATENT DOCUMENTS

| | | | |
|---|---|---|---|
| 4,249,771 | 2/1981 | Gergoe et al. | ...................... 296/146.16 |
| 4,918,865 | 4/1990 | Hirai . | |
| 5,140,771 | 8/1992 | Moy et al. . | |
| 5,161,419 | 11/1992 | Moy et al. . | |
| 5,203,113 | 4/1993 | Yagi . | |
| 5,385,061 | 1/1995 | Moy et al. . | |
| 5,438,801 | 8/1995 | Ishihara et al. . | |

FOREIGN PATENT DOCUMENTS

| | | |
|---|---|---|
| 62-135772 U | 8/1987 | Japan . |
| 63-19684 U | 2/1988 | Japan . |
| 63-116678 U | 7/1988 | Japan . |
| Y2-4-7353 | 2/1992 | Japan . |
| 2167120 | 5/1986 | United Kingdom . |
| 2169652 | 7/1986 | United Kingdom . |
| 2195392 | 4/1988 | United Kingdom . |
| 2212591 | 7/1989 | United Kingdom . |

*Primary Examiner*—Joseph D. Pape
*Attorney, Agent, or Firm*—Burns, Doane, Swecker & Mathis, LLP

[57]              ABSTRACT

In a drive apparatus for a pivotable window pane held pivotally at one end thereof by a window frame through hinges, an output shaft driven by an electric motor through a reduction mechanism is coupled to a first link which in turn is coupled to the other end of the window pane through a second link and a hinge. The first link and the second link are so arranged that the joint therebetween moves along an arcuate path. The output shaft is positioned at a side closer to the hinge than the center of the arcuate path is. Further, the joint moves within the outer confine of the motor and the reduction mechanism.

40 Claims, 4 Drawing Sheets

DRIVE APPARATUS FOR PIVOTABLE WINDOW PANE

CROSS REFERENCE TO RELATED APPLICATION

This application is based on Japanese patent application No. 8-343407 filed on Dec. 24, 1996, the content of which is incorporated herein by reference.

BACKGROUND OF THE INVENTION

Field of the Invention

The present invention relates to a drive apparatus for a pivotable window pane provided for opening and closing a window opening. The apparatus is useful for electrically driving rear windows (rear quarter windows) of a two-door automotive vehicle.

A conventional drive apparatus for a pivotable window pane has, as known by JP-U 63-116678 for instance, is comprised of an electric motor, a speed reduction mechanism and a link mechanism which has a first and second links. The first link is coupled at one end thereof with an output shaft of the reduction mechanism and at the other end thereof with one end of the second link rotatably. The second link is coupled rotatably with the end of a window pane at the other end thereof. The window pane is held rotatably or swingably at one end thereof by the window frame through a hinge. The drive apparatus is held by the window frame at the other end of the window pane.

In the above window pane drive apparatus, the first and second links are coupled so that the joint therebetween moves between the output shaft and the hinge of the window pane. When the apparatus is installed to drive the rear quarter window of the automotive vehicle, the joint thus reciprocates in the window opening space and the vehicle interior space adjacent to the window opening. This necessitates a sufficient spacing between the rear passenger seat of the automotive vehicle and the first link so that the first and second links are allowed to move freely for opening and closing the rear quarter window opening. As a result, for assuring the sufficient spacing for the links, positioning of the rear passenger seat and the like which are located near the drive apparatus will be restricted.

SUMMARY OF THE INVENTION

It is therefore an object of the present invention to provide a drive apparatus for a pivotable window pane, which has an excellent mountability in an automotive vehicle compartment.

According to the present invention, an output shaft is located nearer to the hinge of window panes than the arcuate moving path of the joint between a first and second links. That is, the output shaft is positioned closer to the hinge than a center or midpoint of the arcuate moving path. The first link is moved transversely only within an outer confine of a housing for an electric motor and a speed reduction mechanism. This eliminates the necessity of providing a spacing for the movement of the first link laterally from the housing.

BRIEF DESCRIPTION OF THE DRAWINGS

Other objects, features and advantages of the present invention will become more apparent from the following detailed description when read with reference to the accompanying drawings, in which.

DETAILED DESCRIPTION OF THE PREFERRED EMBODIMENT

Figure 1:
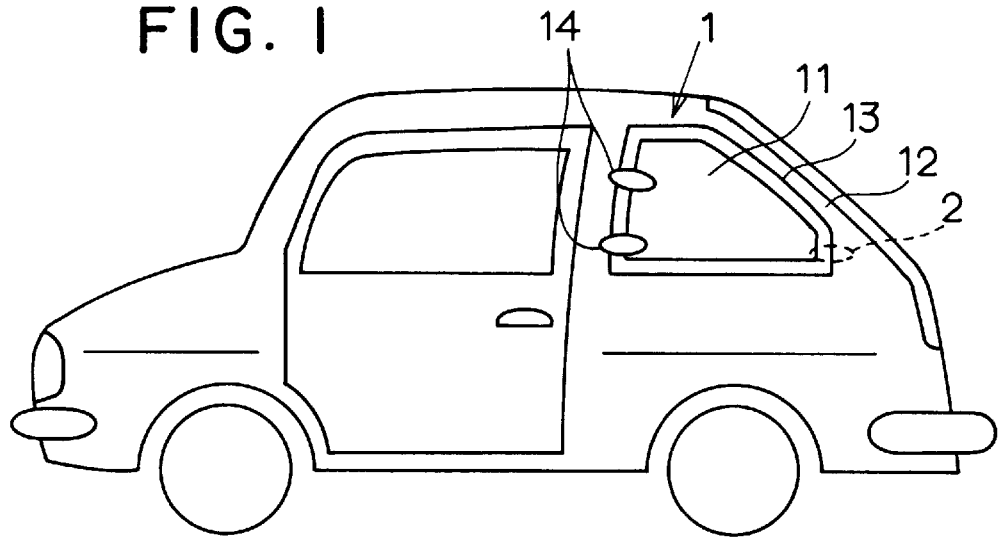
FIG. 1 is a schematic side view of an automotive vehicle having a drive apparatus of the present invention.

The present invention will be described in detail with reference to two embodiments shown in the accompanying drawings, in which the same reference numerals are used to designate the same or similar parts throughout the embodiments.

(First Embodiment)

A drive apparatus according the first embodiment of the present invention is applied to a compact size automotive vehicle which has rear quarter windows 1 at the rear of central posts or pillars as shown in FIG. 1 and is denoted by reference numeral 2. Each window 1 has a window opening 11 defined by a window frame 12 which is a part of a vehicle chassis. A window pane 13 is coupled with a window frame 12 at its one end (front end) through hinges 14 laterally movably.

The drive apparatus 2 is held by the window frame 12 near the other end (rear end) of the window pane 13 thereby to pivotably or reciprocably move the window pane 13 around the central post for opening and closing the window opening 11.

Figure 4:
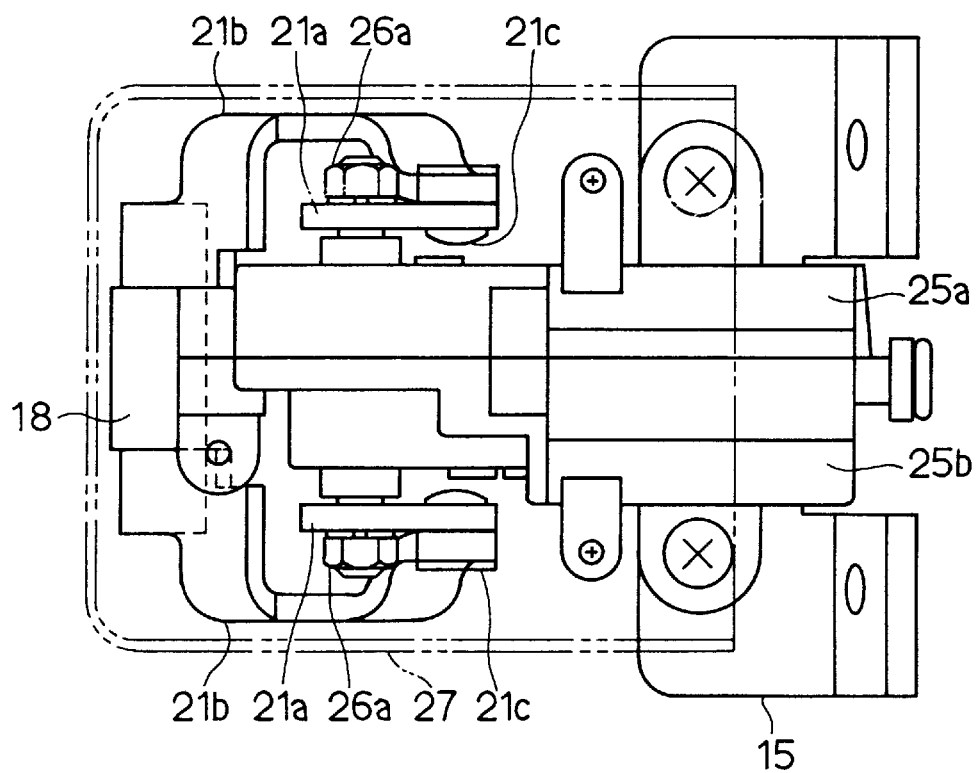
FIG. 4 is a side plan view of the drive apparatus when viewed in the direction IV in FIG. 2.
Figure 2:
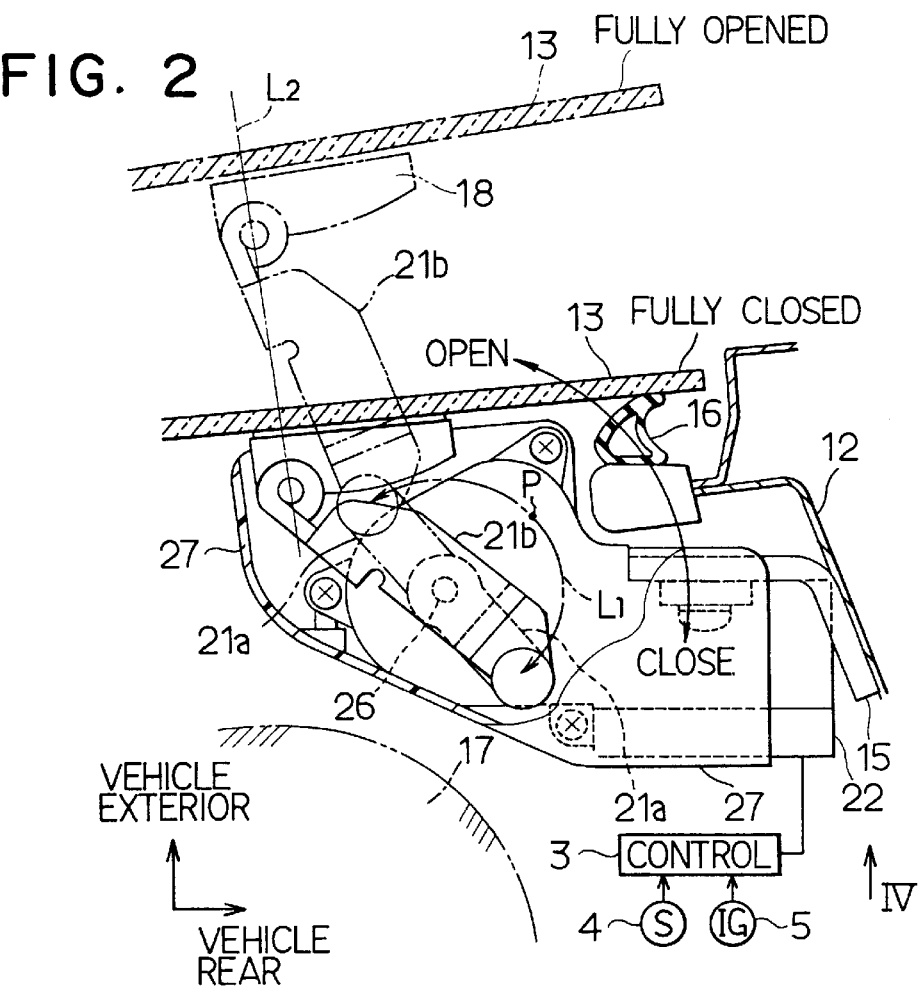
FIG. 2 is a top plan viw, partly in section, of the drive apparatus according to a first embodiment of the invention.

The drive apparatus 2 is comprised of, as shown in FIGS. 2 and 4, a pair of link mechanisms 21 each having a first link 21a and a second link 21b, and a drive unit 22 which drives the link mechanism 21. The drive unit 22 is fixedly attached to the window frame 12 through a bracket 15. The window frame 12 has a sealing weather strip 16 made of a rubber to seal a clearance between the window pane 13 and the frame 12 in the known manner. The drive unit 22 is positioned near the rear corner of a reclining seat back of a rear passenger seat 17.

Figure 3:
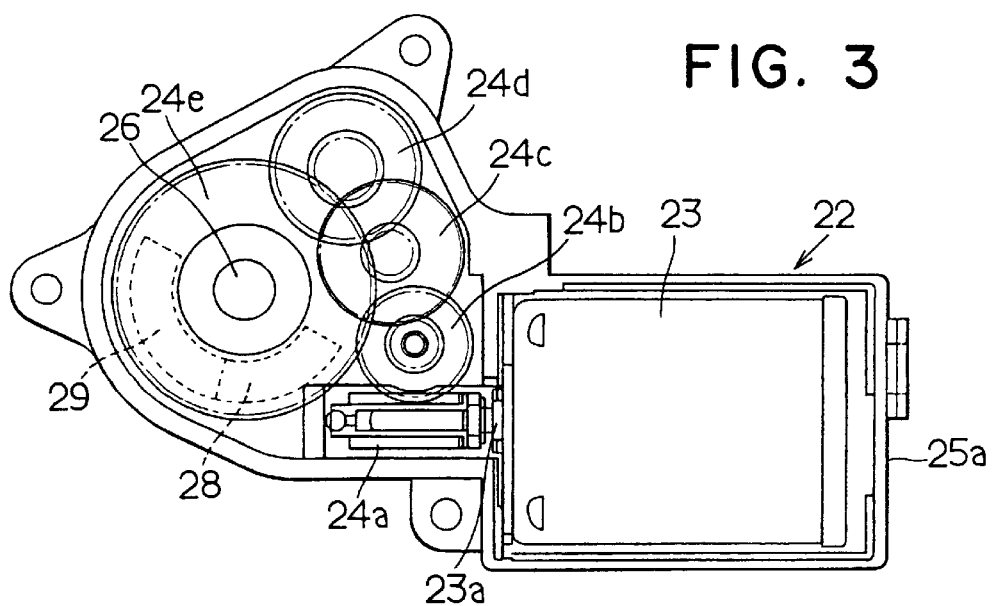
FIG. 3 is a top plan view of a motor and a reduction mechanism used in the first embodiment shown in FIG. 2.

The drive unit 22 is comprised of, as shown in FIG. 3, an electric motor 23 which generates a rotary force for driving the link mechanism 21, a speed reduction mechanism 24 which reduces the rotation speed and transmits the rotary force of the motor 23 to the link mechanism 21, and a first and second resin housings 25a and 25b (FIG. 4) which are engaged to each other detachably and house therein the motor 23.

The reduction mechanism 24 is comprised of a worm 24a fitted on the rotary shaft 23a of the motor 23, a worm wheel 24b and planar wheels 24c through 24e. The planar wheel 24e at the last stage of the reduction mechanism 24 is formed with an output shaft 26 integrally which is coupled to one longitudinal end of the first link 21a. As shown in FIG. 4, the longitudinal end of the first link 21a is tightly fastened to the longitudinal ends of the output shaft 26 by a nut 26a at both ends of the output shaft 26. Thus, the first link 21a is held integrally with the output shaft 26 and restricted from being disengaged from the output shaft 26 to rotate with the output shaft 26.

The wheel 24 is further formed with a movable-side protrusion 28 extending toward the inner wall side of the housing 25a, while the housing 25a is formed with a fixed-side protrusion 29 on the inner wall side thereof in correspondence with the movable-side protrusion 28. The fixed-side protrusion 29 is provided to be contacted by the movable-side protrusion 28 which rotates with wheel 24e and to restrict the output shaft 26 and the first link 21a from rotating further. Thus, the protrusions 28 and 29 operates as a mechanical stopper.

The other longitudinal end of the first link 21a is joined rotatably to one longitudinal end of the second link 21b by a pin 21c (FIG. 4) which is a joint between the two links 21a and 21b. The other longitudinal end of the second link 21b is coupled rotatably to the rear end side of the window pane 13 through a hinge 18.

The reduction mechanism 24 and the links 21a and 21b are covered by a resin cover 27 so that the links 21a and 21b will not touch passengers directly in the vehicle interior compartment at any positions of the links 21a and 21b.

The drive apparatus is further comprised of an electronic controller 3 which is connected to a command switch 4 and an engine ignition switch 5, both being operable by a vehicle driver or a vehicle passenger. The controller 3 controls operation of the motor 23.

The drive apparatus 2 according to this embodiment operates to swing the window pane 13 as follows.

When the window opening 11 is in the closed state, the window pane 13 is in contact with the weather strip 16 as shown by the solid line in FIG. 2. Under this condition, the first link 21a is in the position shown by the dotted line in FIG. 2, while the second link 21b is in the position shown by the solid line in FIG. 2.

When the command switch 4 is operated to open the window opening 11 under the condition that the ignition switch 5 is maintained on, the controller 3 drives the motor 23 to rotate in the forward direction. The forward rotation of the motor 23 transmitted to the output shaft 26 through the reduction mechanism 24 rotates the first link 21a in the counter-clockwise direction in FIG. 2 until the movable-side protrusion 28 hits the fixed-side protrusion 29. During this forward movement, the joint between the first and second links 21a and 21b moves from the vehicle interior side to the window opening side along the arcuate path L1 shown by the one-dot chain line in FIG. 2. When the rotation of the output shaft 26 and hence the motor rotation are restricted thus mechanically by the protrusions 28 and 29, the motor current increases. In response to the increased motor current in excess of a threshold value, the controller 3 detects that the first and second links 21a and 21b as well as the window pane 13 have rotated to the window full-open positions shown by the respective two-dot chain lines in FIG. 2. The controller 3 thus electrically stops the electric power supply to the motor 23.

When the command switch 4 is operated to close the window opening 11 on the other hand, the controller 3 drives the motor 23 to rotate in the reverse direction. The reverse rotation of the motor 23 transmitted to the output shaft 26 through the reduction mechanism 24 rotates the first link 21a in the clockwise direction in FIG. 2 until the movable-side protrusion 28 hits the fixed-side protrusion 29. During this reverse movement, the joint between the first and second links 21a and 21b moves from the window opening side to the vehicle interior side along the arcuate path L1 shown by the one-dot chain line L1 in FIG. 2. When the rotation of the output shaft 26 and hence the motor rotation are restricted thus mechanically by the protrusions 28 and 29, the motor current increases. In response to the increased motor current in excess of the threshold value, the controller 3 detects that the first and second links 21a and 21b as well as the window pane 13 have returned to the window full-closure positions shown in FIG. 2. The controller 3 thus electrically stops the electric power supply to the motor 23.

As described above, the joint between the first and the second links 21a and 21b reciprocates along the arcuate path L1 of about 180 degrees, while the joint between the hinge 18 and the second link 21b reciprocates along the straight path L2. Thus, the joint between the links 21a and 21b moves laterally at the more rear or exterior side than the rear corner of the rear seat 17 within the generally circular outer confine of the reduction mechanism 21. That is, the output shaft 26 is located generally closer to the hinges 18 about which the window pane 13 pivots than the center or midpoint P of the arcuate path L1 is.

As the first link 21a moves only within the outer confine of the drive unit 22, no additional space for the first link 21a to move need be provided laterally outside the drive unit 22. That is, the spacing between the cover 27 and the rear corner of the rear seat 17 can be reduced to a minimum. Thus, the mountability of the drive apparatus 2 is enhanced.

(Second Embodiment)

The drive apparatus according to the second embodiment is similar to the first embodiment but modified as described below.

Figure 5:
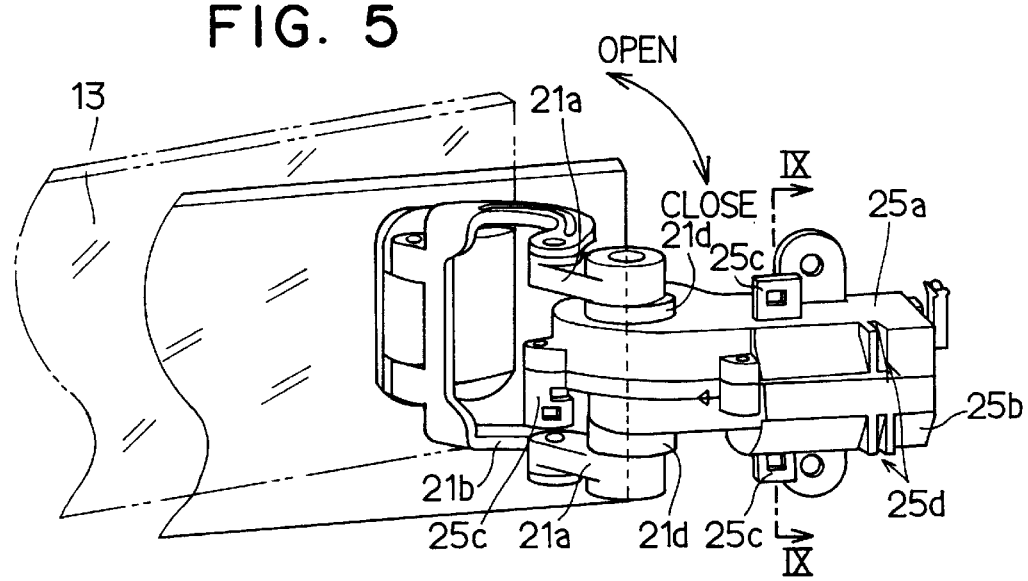
FIG. 5 is a perspective view of a drive apparatus according to a second embodiment of the present invention.
Figure 6:
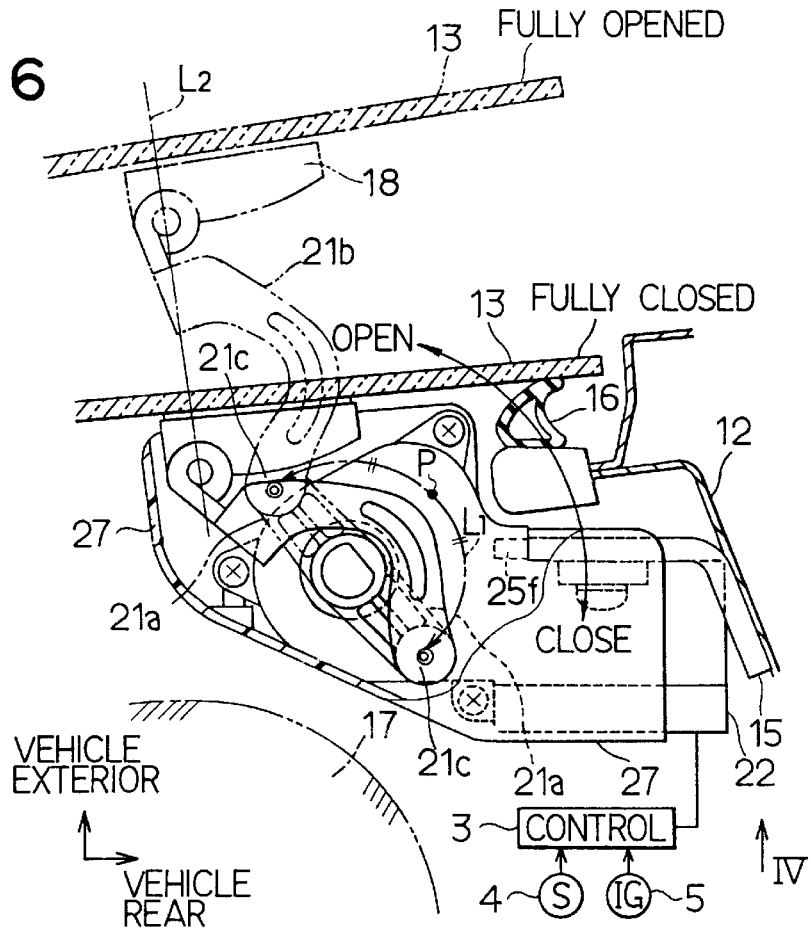
FIG. 6 is a top plan view, partly in section, of the drive apparatus according to the second embodiment of the invention.
Figure 7:
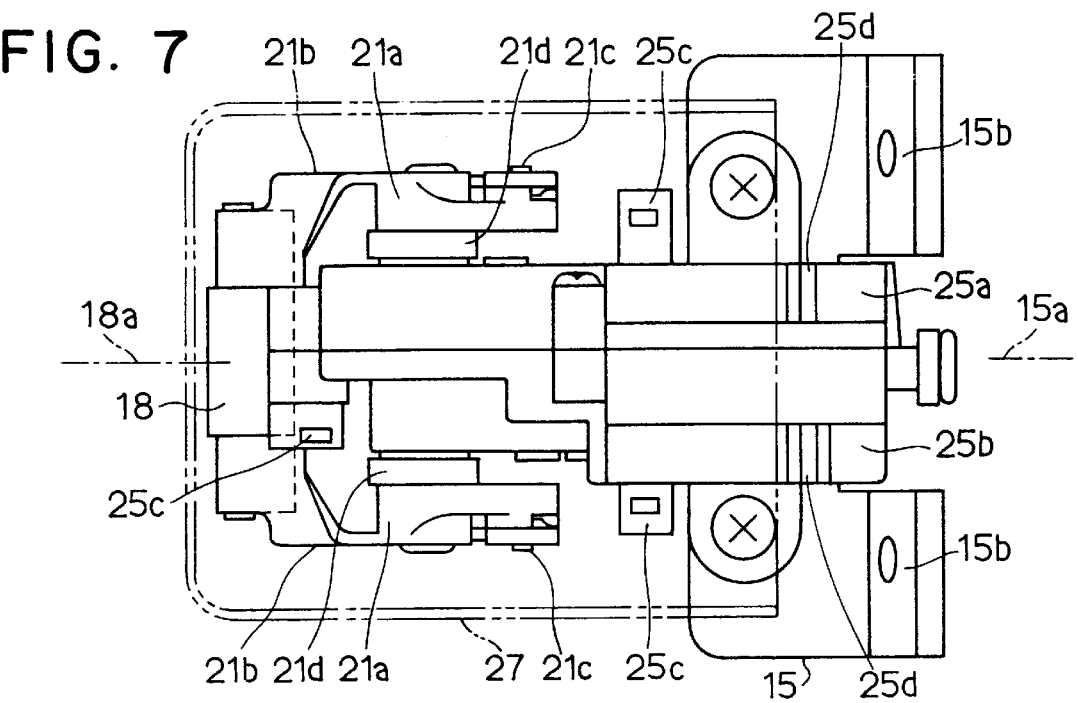
FIG. 7 is a top plan view of a motor and a reduction mechanism used in the second embodiment shown in FIGS. 5 and 6.

In this embodiment, as shown in FIGS. 5, 6 and 7, the first link 21a and the second link 21b are coupled rotatably to each other by a rivet (joint) 21c. The second link 21b coupled also with the hinge 18 is shaped in an arcuate form which surrounds the output shaft 26 when the window pane 13 is at the fully closed position shown by the solid line. The second link b thus extends toward the midpoint P of the arcuate moving path L1 along wich the joint 21c moves. The output shaft 26 is disposed at the side closer to the hinge 18 (left side in FIG. 6) than the midpoint P of the moving path L1 is.

The first link 21a and the second link 21b are provided at both axial end sides of the output shaft 26. The first link 21a has a D-shaped hole into which each D-shaped axial end of the output shaft 26 is fitted firmly without using any nuts. The second link 21b is formed integrally and disposed within the axial length of the output shaft 26. That is, as understood from FIGS. 5 and 7, the outside surface of the second link 21b is substantially in line with the axial end of the output shaft 26.

As understood from FIG. 7, the bracket 15 has two attachment parts 15b having respective screw holes through which screws (not shown) are inserted to fixedly attach the housings 25a and 25b to the vehicle chassis 12. The attachment parts 15b are positioned so that the midpoint or center 15a therebetween resides on the same plane as the axial midpoint or center 18a of the hinge 18. The bracket 15 is engaged with the housings 25a and 25b through engagement holes 25f as shown in FIG. 6.

Figure 8:
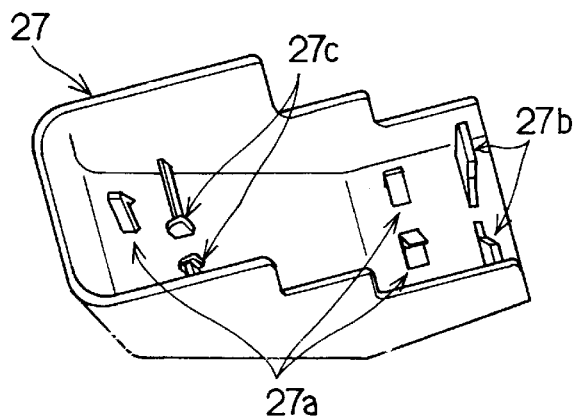
FIG. 8 is a perspective view of a cover used in the second embodiment.
Figure 9:
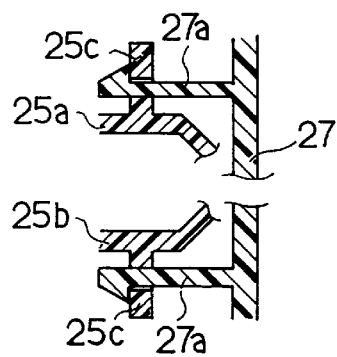
FIG. 9 is a sectional view of the cover taken along the line IX—IX in FIG. 5.

The housings 25a and 25b have on the outer surfaces thereof three projections 25c which have respective fitting holes. The housings 25a and 25b further have respective slits 25d and projections 25e. As shown further in detail in FIGS. 8 and 9, the cover 27 has on its inside surface three projections 27a in positional correspondence with the projections 25c of the housing 25. The projections 27a have respective enlarged heads (FIG. 9) which are inserted through the holes of the projections 25c to tightly hold engagement of the cover 27 with the housings 25a and 25b. The cover 27 also has a pair of projections 27b in positional correspondence with the slits 25d on the housings 25a and 25b. When the projections 27b are inserted into the slits 25d, the position of the cover 27 is fixed in relation to the housings 25a and 25b and the projections 27a are fitted with the projections 25c. The cover 27 further have projections 27c which restricts wobbling of the cover 27 when the cover 27 is attached to the housings 25a and 25b.

Figure 10:
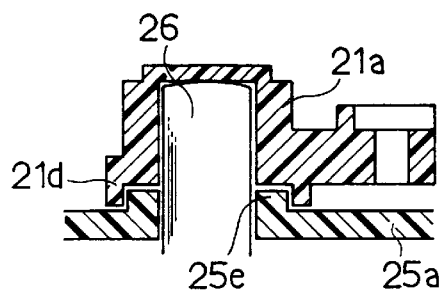
FIG. 10 is a sectional view of a first link with a flange used in the second embodiment.

As shown in FIG. 10, each first link 21a has a flange 21d which covers a bearing part 25e formed integrally on the outside surface of each housing 25a, 25b. The bearing part 25e supports the output shaft 26 rotatably and the flange 21d protects the bearing part 25e from foreign matters such as water and dust particles.

The drive apparatus according to the above embodiments may be so modified that, when the ignition switch 5 is turned from on-position to the off-position, the controller 3 responsively drives the motor 23 to rotate in the reverse direction to close the window opening 11 by pivotally pulling the window pane 13 toward the vehicle interior. Thus, the window opening 11 can be closed automatically and assuredly whenever the vehicle driver turns off the ignition and leaves the vehicle.

Further, the drive apparatus may be applied to a top window provided in the ceiling of the automotive vehicle.

The present invention should not be limited to the above embodiment and the above modification but may be modified or altered still further without departing from the scope and the spirit of the invention.

What is claimed is:

1. A drive apparatus for a pivotable window which has a window frame defining a window opening, a window pane held to open and close the window opening and a hinge pivotally coupling one end of the window pane to the window frame, the drive apparatus comprising:
    an electric motor for generating a rotary force;
    an output shaft for transmitting the rotary force of the motor;
    a first link integrally rotatable with the output shaft; and
    a second link movably coupling the first link to the hinge through a movable joint having a predefined path of movement,
    wherein the output shaft is positioned closer to the hinge than a center of the path of movement of the joint between the first link and the second joint; and
    wherein the first link and the second link are movable in a horizontal plane perpendicular to the window pane.

2. The drive apparatus according to claim 1, wherein the output shaft is disposed on an interior side of the window pane, the output shaft being spaced from the window pane, on the interior side thereof, a greater distance than the center of the path of movement of the joint.

3. The drive apparatus according to claim 2, further comprising:
    a housing for housing the electric motor and the output shaft.

4. The drive apparatus according to claim 1, further comprising:
    a cover covering the first link and the second link.

5. The drive apparatus according to claim 4, wherein the cover is fixed to a housing for housing the electric motor and the output shaft.

6. The drive apparatus according to claim 5, wherein the housing and the cover have respective engagement parts which are engageable with ech other.

7. The drive apparatus according to claim 5, wherein the housing has a positioning part for defining a position of the cover.

8. The drive apparatus according to claim 1, wherein the second link extends arcuately toward the moving path of the joint.

9. The drive apparatus according to claim 8, wherein the output shaft includes opposing end surfaces defining therebetween an axial length, the first link and the second link are arranged at the axial end surfaces of the output shaft, and the second link is positioned substantially within the axial length of the output shaft.

10. The drive apparatus according to claim 9, wherein the second link (21b) is formed integrally.

11. The drive apparatus according to claim 3, further comprising:
    a bracket for attaching the housing to a vehicle chassis.

12. The drive apparatus according to claim 11, wherein the bracket has a plurality of attachment parts the center of which is on the same plane as an axial center of the hinge connecting the second link and the window pane.

13. The drive apparatus according to claim 11, wherein the bracket is engaged with the housing.

14. The drive apparatus according to claim 3, wherein the housing includes a bearing part and the first link includes a flange, the flange of the first link covering the bearing part of the housing.

15. A drive apparatus for a pivotable window which has a window pane pivotably movable around one end side thereof relative to a window opening of a vehicle, the drive apparatus comprising:
    an electric motor for generating a rotary force;
    a housing accommodating the electric motor therein and attached to a body panel of the vehicle;
    an output shaft accommodated in the housing and extending vertically in parallel with the window pane, the output shaft having opposing longitudinal ends, and the output shaft transmitting the rotary force of the electric motor;
    a first link having a first end and a second end, the first end being coupled with the longitudinal ends of the output shaft and positioned to rotate in a space between the output shaft and the body panel; and
    a second link having a first end and a second end, the first end being rotatably coupled with the second end of the first link and the second end of the second link being coupled to the window pane through a hinge.

16. The drive apparatus according to claim 15, further comprising:
    a cover covering the first link and the second link in a compartment of the vehicle.

17. The drive apparatus according to claim 15, wherein the second link is shaped to have an arcuate part between the second end thereof and the hinge so that the arcuate part bypasses the output shaft when the window pane is at a position to close the window opening.

18. The drive apparatus according to claim 17, wherein the second link is curved in a rear direction of the vehicle to surround the output shaft when the window pane is at a position to close the window opening.

19. The drive apparatus according to claim 15, wherein the second link has a vertical length shorter than that of the output shaft.

20. The drive apparatus according to claim 15, wherein the first link is fixed to both of the ends of the output shaft, and the second link is coupled with the second end of the first link.

21. The drive apparatus according to claim 15, further comprising:
   a bracket having a pair of attachment parts for attaching the housing to the body panel,
   wherein a center between the attachment parts and a center of the hinge are on a horizontal plane parallel with a horizontal plane in which the first link and the second link rotate.

22. The drive apparatus according to claim 15, wherein the window pane is provided in a rear side part of the vehicle.

23. The drive apparatus according to claim 22, wherein the hinge is attached to a rear side of the window pane.

24. The drive apparatus according to claim 15, wherein the second link has a pair of parts positioned at both sides of the housing to sandwich a motor shaft of the electric motor.

25. A drive apparatus for a pivotable window which has a window pane pivotably movable around one end side thereof relative to a window opening of a vehicle, the drive apparatus comprising:
   an electric motor for generating a rotary force;
   a housing accommodating the electric motor therein and attached to a body panel of the vehicle;
   an output shaft accommodated in the housing and extending vertically in parallel with the window pane, the output shaft having opposing longitudinal ends, and the output shaft being for transmitting the rotary force of the electric motor;
   a first link having a first end and a second end, the first end being coupled with both ends of the output shaft and positioned to rotate from an interior side to an exterior side of the vehicle in a space behind the output shaft with respect to a front and rear direction of the vehicle when the window pane is moved to open the window opening; and
   a second link having a first end and a second end, the first end being rotatably coupled with the second end of the first link and the second end being coupled with the window pane through a hinge coupled to another side of the window pane.

26. The drive apparatus according to claim 25, further comprising:
   a cover covering the first link and the second link in a compartment of the vehicle.

27. The drive apparatus according to claim 25, wherein the second link is shaped to have an arcuate part between the second end thereof and the hinge so that the arcuate part bypasses the output shaft when the window pane is at a position to close the window opening.

28. The drive apparatus according to claim 27, wherein the second link is curved in a rear direction of the vehicle to surround the output shaft when the window pane is at a position to close the window opening.

29. The drive apparatus according to claim 25, wherein the second link has a vertical length shorter than that of the output shaft.

30. The drive apparatus according to claim 25, wherein the first link is fixed to both ends of the output shaft, and the second link is coupled with the second end of the first link.

31. The drive apparatus according to claim 25, further comprising:
   a bracket having a pair of attachment parts for attaching the housing to the body panel,
   wherein a center between the attachment parts and a center of the hinge are on a horizontal plane parallel with a horizontal plane in which the first link and the second link rotate.

32. The drive apparatus according to claim 25, wherein the window pane is provided in a rear side part of the vehicle.

33. The drive apparatus according to claim 32, wherein the hinge is attached to a rear side of the window pane.

34. The drive apparatus according to claim 25, wherein the second link has a pair of parts positioned at both sides of the housing to sandwich a motor shaft of the electric motor.

35. A drive apparatus for a pivotable window of a vehicle which has a window frame defining a window opening and a window pane held pivotally to the window frame at one end thereof, the drive apparatus comprising:
   a housing attached to a chassis of the vehicle;
   a drive mechanism housed within the housing:
   a reduction mechanism including a plurality of wheels and an output shaft, the output shaft being integral with a last-stage wheel of the plurality of wheels of the reduction mechanism and having first and second longitudinal ends;
   a link mechanism coupled with both of the longitudinal ends of the output shaft and with the window pane and held substantially horizontally movably at a side of a compartment of the vehicle; and
   means for separating the link mechanism from the compartment.

36. The drive apparatus according to claim 35, wherein the separating means includes a cover attached to the housing.

37. The drive apparatus according to claim 35, wherein the link mechanism has a link having one end coupled with the output shaft for rotation therewith and another end movable laterally only within an outer confine of the reduction mechanism.

38. The drive apparatus according to claim 35, wherein the link mechanism has a link having one end coupled with the output shaft for rotation therewith and another end positioned at a rear side of the output shaft at a time of closure of the window pane.

39. The drive apparatus according to claim 38, wherein the another end of the link is held movably from a more compartment side to a more window opening side than the output shaft at a time of opening the window pane.

40. The drive apparatus according to claim 35, wherein the link mechanism has a first link and a second link, the first link is coupled with the output shaft and the second link, the second link is coupled with the window pane, a joint between the first link and the second link is movable arcuately around the output shaft at a window side away from a rear corner of a passenger seat, and a joint between the second link and the window pane is movable in a generally straight line.

* * * * *